United States Patent [19]

Scrivo

[11] 4,106,804
[45] Aug. 15, 1978

[54] ENERGY ABSORBING BUMPER ASSEMBLY

[75] Inventor: Jerry V. Scrivo, Durham, N.H.

[73] Assignee: McCord Corporation, Detroit, Mich.

[21] Appl. No.: 661,710

[22] Filed: Feb. 26, 1976

[51] Int. Cl.² .............................................. B60R 19/10
[52] U.S. Cl. .................................................... 293/63
[58] Field of Search .................................. 293/63–69,
293/88, 71 K, 62, 60, 71 R

[56] References Cited

U.S. PATENT DOCUMENTS

| | | | |
|---|---|---|---|
| 2,614,877 | 10/1952 | Benian | 293/66 |
| 3,610,609 | 1/1969 | Sobel | 293/63 X |
| 3,690,710 | 9/1972 | Curran | 293/60 X |
| 3,782,768 | 1/1974 | Moore | 293/63 X |
| 3,791,693 | 2/1974 | Hellriegel | 293/63 X |
| 3,848,916 | 11/1974 | Hulten | 293/63 X |
| 3,860,279 | 1/1975 | Hulten | 293/63 X |
| 3,926,462 | 12/1975 | Burns et al. | 293/69 R |

*Primary Examiner*—Robert R. Song
*Assistant Examiner*—Norman L. Stack, Jr.
*Attorney, Agent, or Firm*—McGlynn and Milton

[57] ABSTRACT

An energy absorbing bumper assembly including a mounting means defined by metal mounting plates adapted for attachment to a vehicle and an elongated shell made of elastomeric material disposed adjacent or forwardly of the mounting plate. Urethane energy absorbing pairs of blocks are disposed adjacent the center line of the bumper assembly between the front face of the shell and the mounting plate. Each pair includes first and second members which are spaced vertically apart and define a cavity adjacent and interiorly the front face of the shell. Second energy absorbing urethane pairs of blocks are disposed adjacent the ends of the assembly between the front face of the shell and the mounting plate. The pairs define the first bumper means for absorbing a first quantity of energy resulting from specified impacts. A second bumper means of elastomeric material for absorbing a different quantity of energy resulting from impacts other than the specified impacts is disposed within the cavity and extends longitudinally along the shell.

25 Claims, 9 Drawing Figures

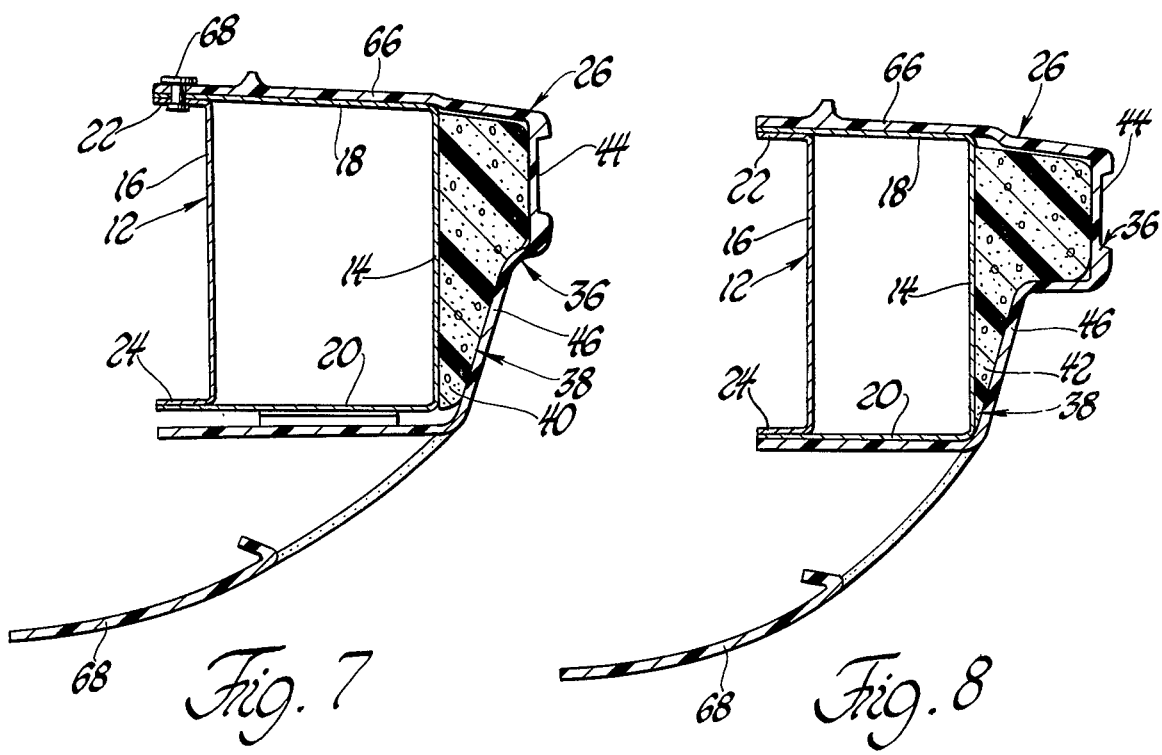
Fig. 7
Fig. 8
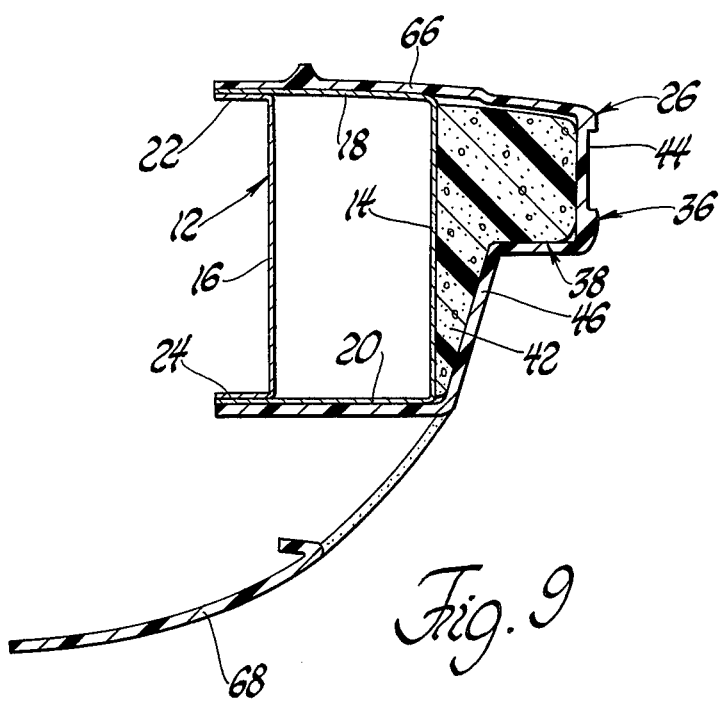
Fig. 9

ENERGY ABSORBING BUMPER ASSEMBLY

BACKGROUND OF THE INVENTION

This invention relates to an energy absorbing bumper assembly and more particularly to an energy absorbing bumper assembly for vehicles. The energy absorbing bumper assembly renders the vehicle more safe by absorbing and distributing energy upon impact of the vehicle bumper with a foreign object.

Because of the concern regarding the protection afforded to automobile occupants and vehicle body structure by bumper assemblies, the United States Congress has passed federal safety standards setting forth requirements for the impact resistance and configuration of front and rear vehicle surfaces. In particular, the vehicle surface must pass the center pendulum and low-engagement pendulum impact tests. These standards require that the vehicle be able to sustain a number of specified impacts at various positions along the bumper assemblies thereof. Broadly, requirements are such that the bumper assembly must sustain specified frontal impacts and must sustain specified impacts at the ends or corners thereof.

As shown in U.S. Pat. No. 3,866,963 granted Feb. 18, 1975 in the name of Peter A. Weller, energy absorbing blocks of an elastomeric material have been disposed between a shell and a mounting means of a bumper assembly at the assembly's corners and frontal face. When these blocks are partially contacted by an impacting device, the elastomeric material in the impact zone tends to bulge into the adjacent uncompressed elastomeric material. This characteristic can result in a force being generated normal or perpendicular to the impacting device. Furthermore, this characteristic can also result in loading of the energy absorbing block in shear and a lifting of the vehicle. To minimize this undesirable lifting characteristic of the block, an anti-lift feature in the form of a cored-out area adjacent the impact zone is provided by the present invention.

This invention also provides an energy absorbing bumper assembly having a configuration particularly suitable for meeting current specified impact requirements as well as meeting practical requirements.

An energy absorbing bumper assembly constructed in accordance with this invention includes a mounting means adapted for attachment to a vehicle and an elongated shell disposed adjacent the mounting means with first bumper means for absorbing a first quantity of energy disposed between the shell and the mounting means. The first bumper means includes a plurality of block pairs spaced apart, each block pair comprising first and second members spaced vertically apart and defining a cavity adjacent a front face of the shell. A second bumper means is disposed within the cavity of the block pairs. The second bumper means has a different energy absorbing capacity than the first bumper means and the second bumper means absorbs a second quantity of energy.

Other advantages of the present invention will be readily appreciated as the same becomes better understood by reference to the following detailed description when considered in connection with the accompanying drawings wherein:

FIG. 7 is a cross-sectional view taken substantially along line 7—7 of FIG. 1;

FIG. 8 is a cross-sectional view taken substantially along line 8—8 of FIG. 1; and FIG. 9 is a cross-sectional view taken substantially along line 9—9 of FIG. 1 which is also the center line of the subject energy absorbing bumper assembly.

Figure 1:
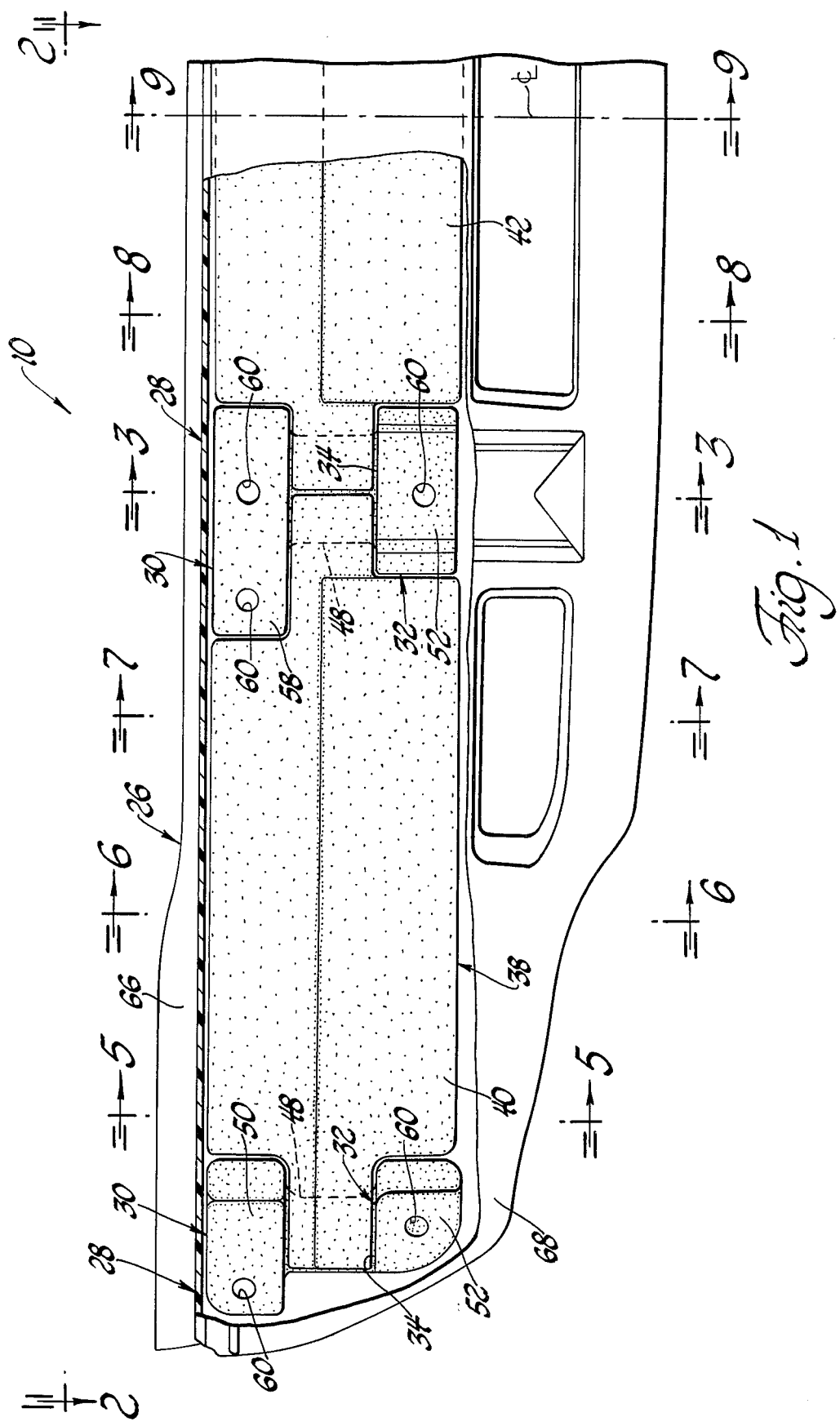
FIG. 1 is a front-elevational view partially broken away and in cross section of the preferred embodiment of the instant invention.
Figure 2:
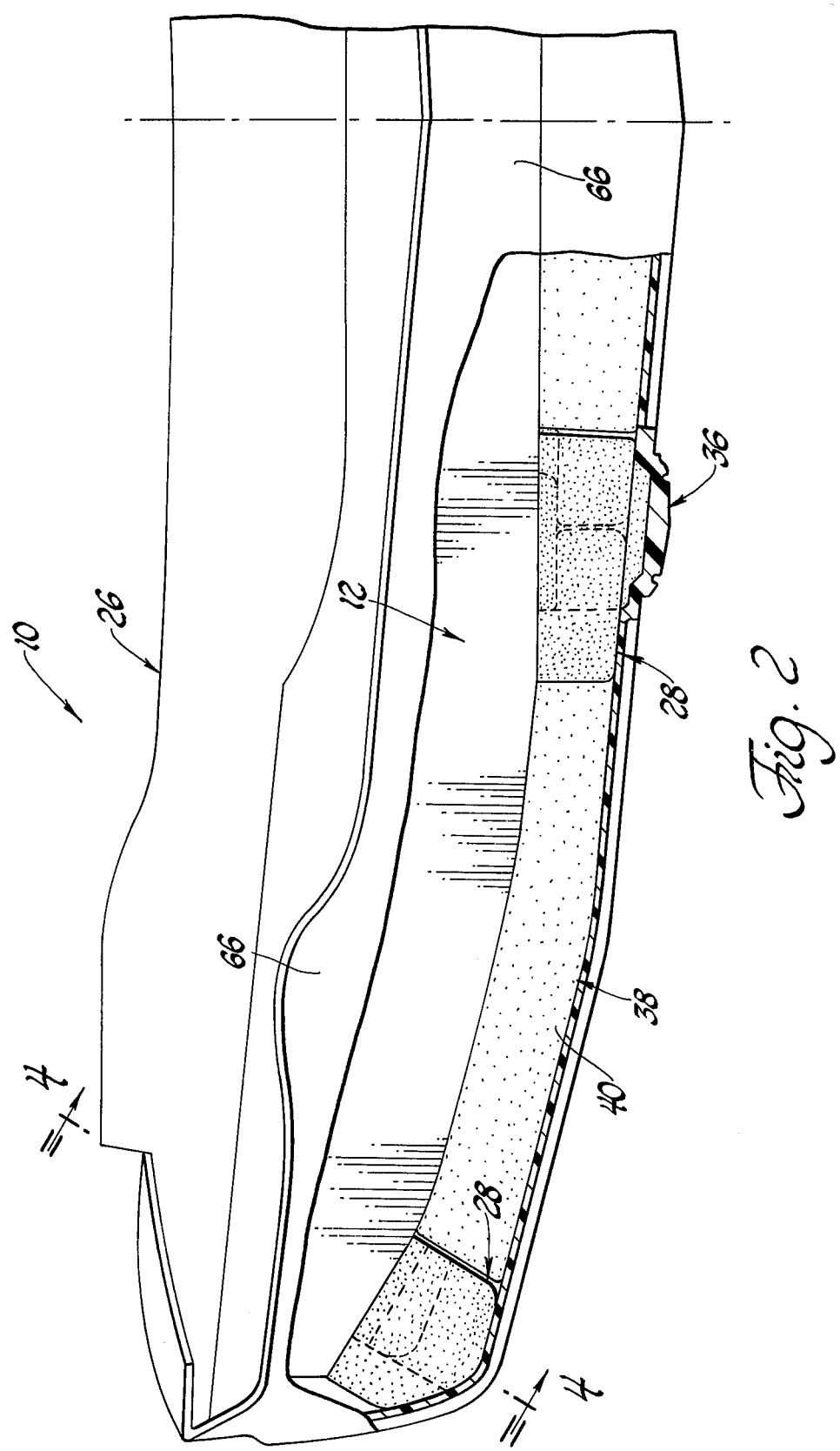
FIG. 2 is a fragmentary plan view of the embodiment of FIG. 1 partially broken away and in cross section.

Referring now to the drawings, an energy absorbing bumper assembly constructed in accordance with the instant invention is generally shown at 10 in FIGS. 1 and 2.

The energy absorbing bumper assembly 10 includes a mounting means generally indicated at 12 adapted for attachment to a vehicle such as a passenger automobile. The mounting means 12 may be bolted, welded or otherwise secured to the frame of an automobile. The mounting means 12 comprises metal plates 14 and 16. The first metal plate 14 includes integral top and bottom first flanges 18 and 20 respectively which extend rearwardly from the plate 14. A second metal plate 16 includes integral top and bottom second flanges 22 and 24 respectively which extend rearwardly from the plate 16. The first flanges 18 and 20 and the second flanges 22 and 24 overlap and are secured by welding or the like.

The assembly 10 also includes an elongated shell generally shown at 26 and disposed adjacent and forward of the mounting means 12. A first bumper means of elastomeric material is disposed between the mounting means 12 and the shell 26 for absorbing a first quantity of energy. The first bumper means includes a plurality of block pairs or pairs of blocks generally indicated at 28. These pairs 28 are spaced apart or shown in FIG. 1 and FIG. 2. Each pair 28 comprises first and second members generally indicated at 30 and 32 respectively, which are vertically spaced apart and define a cavity 34 adjacent a front face generally indicated at 36 of the shell 26.

The first and second members 30 and 32 respectively may be made of any of the well-known resilient or elastomeric materials including natural and synthetic rubbers. Preferably, however, the material is a foam plastic material, such as, microcellular polyurethane foam having a thick skin which provides strength and surface protection. A preferred formulation for the microcellular polyurethane is disclosed in U.S. Pat. No. 3,575,896 granted Apr. 20, 1971 in the name of O. R. Khan.

A second bumper means generally indicated at 38 is disposed within the cavity 34 and absorbs a second quantity of energy when impacted with a foreign object. In other words, the second bumper means has a different energy absorbing capacity than the first bumper means. The second bumper means 38 comprises a first longitudinal member 40, portions of which are disposed within and substantially fill the cavities 34 of spaced-apart block pairs 28 as best seen in FIG. 1. The second bumper means 38 further includes a second longitudinal member 42 portions of which are disposed within and substantially fill the cavities 34 of two block pairs 28, one of the two block pairs being disposed adjacent one side of the longitudinal center line of the shell 26 while the other block pair (not shown) is disposed adjacent the other side of the longitudinal center line. It can be appreciated that the bumper assembly on the right-hand side of the bumper assembly (not shown) is a mirror image of the bumper assembly on the left-hand side of the center line.

Both the first and second longitudinal members 40 and 42 respectively have different energy absorbing properties than the first bumper means. The second bumper means 38 comprises an elastomeric material having a different energy absorbing capacity than the first bumper means 28 either because the density of the elastomeric material of the second bumper means 38 is different than the density of the elastomeric material of the first bumper means or the second bumper means 38 comprises a different elastomeric material than the elastomeric material of the first bumper means 28.

As seen in FIGS. 8 and 9, that portion of the second longitudinal member 42 which extends between the cavities 34 is disposed between the mounting means 12, and more particularly the first metal plate 14, and the front face 36 of the shell 26. This portion of the second longitudinal member substantially fills the space that exists therebetween the first metal plate 14 and the front face 36 of the shell 26.

Figure 3:
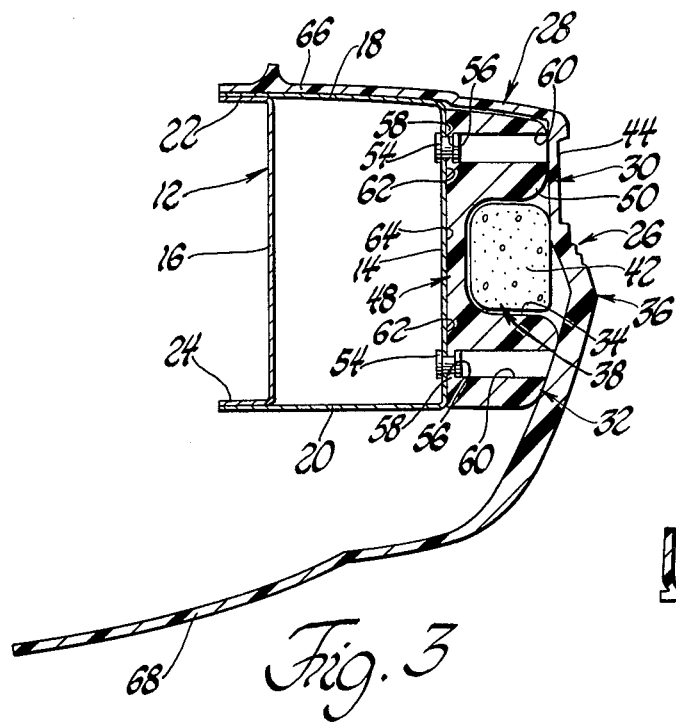
FIG. 3 is a cross-sectional view taken substantially along line 3—3 of FIG. 1.
Figure 4:
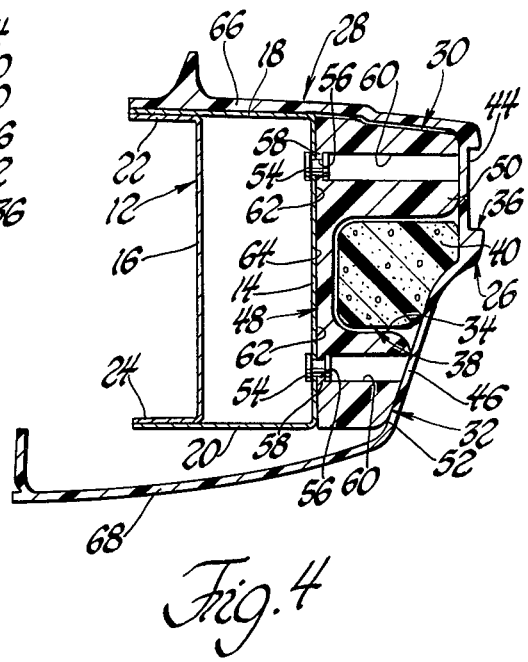
FIG. 4 is a cross-sectional view taken substantially along line 4—4 of FIG. 2.
Figure 5:
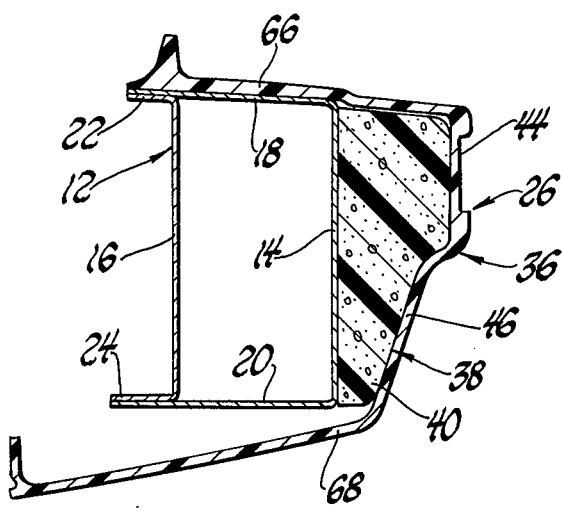
FIG. 5 is a cross-sectional view taken substantially along line 5—5 of FIG. 1.
Figure 6:
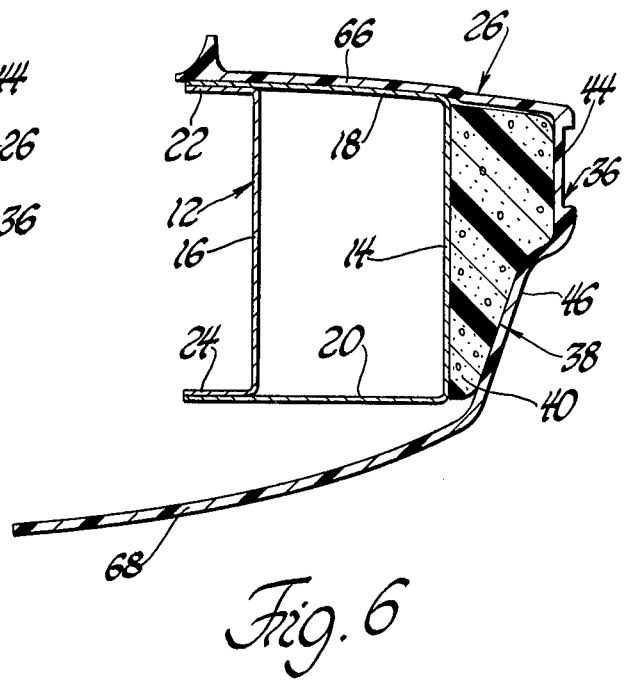
FIG. 6 is a cross-sectional view taken substantially along line 6—6 of FIG. 1.

As shown in FIGS. 3 and 4, the front face 36 has interconnected upper and lower portions 44 and 46 respectively. The first member 30 is disposed between the upper portion 44 and the mounting means 12 for absorbing the first quantity of energy as aforedescribed. The first member 30 absorbs that energy which is transmitted through the upper portion 44 of the front face 36 when the upper portion 44 is impacted. In a similar fashion, the second member 32 is disposed between the lower portion 46 and the mounting means 12 for also absorbing the first quantity of energy. The second member 32 absorbs this first quantity of energy when the lower portion 46 of the front face 36 sustains a specified impact.

As best seen in FIGS. 1, 3 and 4, the block pairs are interconnected by a backing member 48 of the first bumper means. This backing member 48 not only interconnects the first and second members 30 and 32, but also minimizes the loading of the energy absorbing block pair in shear and a lifting of the vehicle when a specified impact is encountered at either the upper portion or the lower portion 44 and 46 respectively. In other words, the backing member 48 allows little energy to be transferred between the first and second members 30 and 32 respectively. As shown in FIGS. 3 and 4, the backing member 48 and the first and second members 30 and 32 respectively define the cavity 34, the backing member 48 and the first and second members 30 and 32 respectively, comprising integrally-formed elastomeric material. The upper and lower members 30 and 32 have front surfaces 50 and 52 respectively adjacent the front face 36, the front surfaces 50 and 52 being noncoplanar with each other. These front surfaces 50 and 52 are adjacent the upper and lower portions 44 and 46 of the front face 36 and generally conform with the configuration or shape of the front face 36 the block pair is positioned between the mounting means 12 and front face 36 of the shell 26. The corners of the upper and lower members 30 and 32 respectively, adjacent the front face 36 are rounded in order to prevent or minimize the possibility that the first and second members 30 and 32 may fracture or chip away at their front surfaces 50 and 52 after sustaining a frontal impact at the front face 36 of the shell 26.

The assembly 10 also includes an attachment means such as rivets 54 shown in FIG. 3 and FIG. 4. The rivets attach the first and second members 30 and 32 to the mounting means 12 and in particular to the first metal plate 14. Each of the members 30 and 32 has an aperture 56 adapted to receive the rivet 54. The members 30 and 32 also have a shoulder portion 58 against which the rivet 54 engages its corresponding member. The aperture 56 is formed through the shoulder portion 58 and the rivet 54 extends therethrough the aperture 56. Both members 30 and 32 also have a hole 60 which extend from each member's front surface 50 and 52 respectively to its corresponding shoulder portion 58. The hole 60 is coaxial with the aperture 56 and allows the positioning of the rivet 54 within the aperture 56 and against the shoulder portion 58. The back surface of each of the members 30 and 32 opposite its front surface 50 and 52 respectively is substantially flat to lay flat against the flat surface of the first metal plate 14 to which each back surface engages. The back surface 64 of the backing member 48 is also substantially flat to lay flat against the flat surface of the first metal plate 14.

As seen in both FIGS. 1 and 2, one of the block pairs 28 is disposed adjacent a curved first end of the shell 26 to absorb energy at that end of the assembly 10 while another of the block pairs 28 is disposed at one side of the longitudinal center line of the shell 26 to absorb energy from a frontal impact at the assembly 10.

The shell 26 also includes a cover 66 which extends rearwardly from the front face 36 above the first member 30. This cover 66 is also disposed vertically above the top flanges 18 and 22 of the first and second metal plates 14 and 16 respectively. As shown in FIG. 7, a rivet 68 attaches the cover 66 to the mounting means 12 at the top flanges 18 and 22. The shell 26 also includes a bottom 68 which extends rearwardly from the front face 36 at the lower extremity of the front face 36.

As noted before, the assembly 10 on the right-hand side of the center line is a mirror image of the left-hand side of the assembly and is not included for the sake of simplicity. But it should be noted that the shell 26 also includes a second end and further includes another of the block pairs 28 disposed adjacent thereto, and, as before, a block pair 28 is also disposed just to the right-hand side of the center line.

The shell 26 is preferably an integral one-piece molded plastic member. Any of a number of well-known plastic materials having sufficient hardness and being readily compounded so as to provide adequate flexibility in the final product may be employed to form the shell 26.

Thus, in accordance with the above description, the subject invention provides a bumper which includes a cavity between vertically spaced bumper means of blocks of energy absorbing material whereby each of the vertically spaced blocks has the energy absorbing capacity for receiving a predetermined impact over a given area of impact without producing an adverse vertical force but yet the two blocks have the requisite energy absorbing capacities when the same predetermined impact is subjected to both blocks over the same given area extending over the two blocks.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

I claim:

1. An energy absorbing bumper assembly comprising: a mounting means adapted for attachment to a vehicle, an elongated shell disposed adjacent said mounting means, a first bumper means of elastomeric material disposed between said mounting means and said shell for absorbing a first quantity of energy, said first bumper means including at least one pair of blocks, said shell having a front face with upper and lower portions, said pair comprising first and second members spaced vertically apart and defining a cavity interiorly of said front face of said shell, said first member presenting a continuous surface from said cavity through said upper portion of said shell, said second member presenting a continuous surface from said cavity through said lower portion of said shell, and a second bumper means disposed within said cavity for absorbing a second quantity of energy, said second bumper means having a different energy absorbing capacity than said first bumper means said continuous surface of said first member being the only medium between said cavity and said upper portion of said shell, said continuous surface of said second member being the only medium between said cavity and said lower portion of said shell.

2. An energy absorbing bumper assembly comprising: a mounting means adapted for attachment to a vehicle, an elongated shell disposed adjacent said mounting means, a first bumper means disposed between said mounting means and said shell for absorbing a first quantity of energy, said first bumper means including at least one pair of blocks, said shell having a front face with upper and lower portions, said pair comprising first and second members spaced vertically apart and defining a cavity disposed interiorly of the front face of said shell, said first member presenting a continuous surface from said cavity through said upper portion of said shell, said second member presenting a continuous surface from said cavity through said lower portion of said shell said continuous surface of said first member being the only medium between said cavity and said upper portion of said shell, said continuous surface of said second member being the only medium between said cavity and said lower portion of said shell.

3. An energy absorbing bumper assembly comprising: a mounting means adapted for attachment to a vehicle, an elongated shell disposed adjacent said mounting means, a first bumper means of elastomeric material disposed between said mounting means and said shell for absorbing a first quantity of energy, said first bumper means including a first pair and a second pair of blocks spaced apart longitudinally of said shell, said shell having a front face with upper and lower portions, each pair of blocks comprising first and second members spaced vertically apart and defining a cavity interiorly of said front face of said shell, said first member presenting a continuous surface from said cavity through said upper portion of said shell, said second member presenting a continuous surface from said cavity through said lower portion of said shell, and a second bumper means disposed within and filling said cavity for absorbing a second quantity of energy, said second bumper means having a different energy absorbing capacity than said first bumper means.

4. An assembly as set forth in claim 3 wherein said second bumper means comprises elastomeric material of a different density than said elastomeric material of said first bumper means.

5. An energy absorbing bumper assembly comprising: a mounting means adapted for attachment to a vehicle, an elongated shell disposed adjacent said mounting means, a first bumper means disposed between said mounting means and said shell for absorbing a first quantity of energy, said first bumper means including a first pair and a second pair of blocks spaced apart longitudinally of said shell, said shell having a front face with upper and lower portions, each pair of blocks comprising first and second members spaced vertically apart and defining a cavity adjacent and interiorly of said front face of said shell, said first member presenting a continuous surface from said cavity through said upper portion of said shell, said second member presenting a continuous surface from said cavity through said lower portion of said shell said continuous surface of said first member being the only medium between said cavity and said upper portion of said shell, said continuous surface of said second member being the only medium between said cavity and said lower portion of said shell.

6. An assembly as set forth in claim 5 wherein at least one of said pairs comprises elastomeric material.

7. An assembly as set forth in claim 6 including a second bumper means disposed within said cavity for absorbing a second quantity of energy, said second bumper means having different energy absorbing properties than said first bumper means.

8. An assembly as set forth in claim 7 wherein said second bumper means comprises elastomeric material.

9. An assembly as set forth in claim 8 wherein said first bumper means includes a backing member and wherein at least one of said pairs is interconnected by said backing member, said interconnected pair and said backing member defining said cavity.

10. An assembly as set forth in claim 9 wherein said backing member and said interconnected pair comprise integrally formed elastomeric material.

11. An assembly as set forth in claim 10 wherein said continuous surfaces of said upper and lower members of each pair are noncoplanar.

12. An assembly as set forth in claim 11 wherein the corners of said upper and lower members interiorly of said front face are rounded.

13. An assembly as set forth in claim 9 including an attachment means for attaching said members to the mounting means.

14. An assembly as set forth in claim 13 wherein each of said members has a shoulder portion for engagement by said attachment means, an aperture being formed through said shoulder portion to receive said attachment means.

15. An assembly as set forth in claim 14 wherein each of said members has a hole extending from its front surface to its corresponding shoulder portion coaxial with said aperture.

16. An assembly as set forth in claim 12 wherein the back surface of each of said members opposite its corresponding continuous surface is substantially flat.

17. An assembly as set forth in claim 16 wherein said shell has a curved first end and one of said pairs is disposed adjacent said curved first end of said shell.

18. An assembly as set forth in claim 16 wherein one of said pairs is disposed adjacent one side of the longitudinal center line of said shell.

19. An assembly as set forth in claim 17 wherein said shell includes a cover extending rearwardly from said front face above said first member.

20. An assembly as set forth in claim 19 wherein said shell includes a bottom extending rearwardly from said front face at the lower extremity thereof.

21. An assembly as set forth in claim 20 wherein said shell includes a second end and including another of said pairs disposed adjacent thereto.

22. An assembly as set forth in claim 21 wherein one of said block pairs is disposed adjacent one side of the longitudinal center line of said shell and including another of said block pairs disposed adjacent the other side of said center line.

23. An assembly as set forth in claim 22 wherein said pairs are supported by said mounting means.

24. An assembly as set forth in claim 23 wherein said mounting means comprises a metal plate.

25. An assembly as set forth in claim 24 wherein said mounting means includes top and bottom flanges extending rearwardly from said plate.

* * * * *